Dec. 29, 1959  B. B. MATZENAUER  2,918,860
ELECTRIC TOASTER
Filed Feb. 25, 1957  4 Sheets-Sheet 1
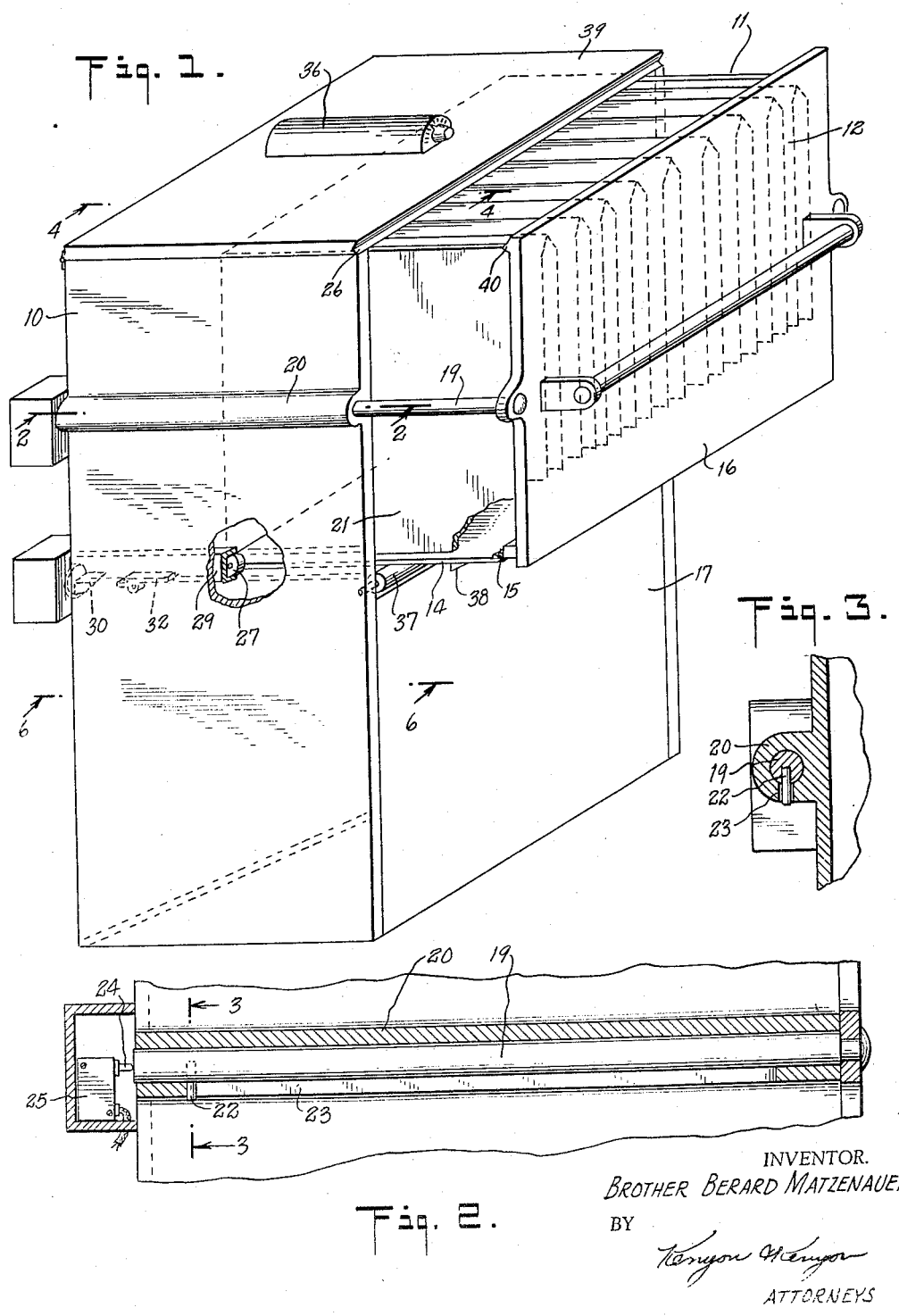
INVENTOR.
BROTHER BERARD MATZENAUER
BY
Kenyon & Kenyon
ATTORNEYS

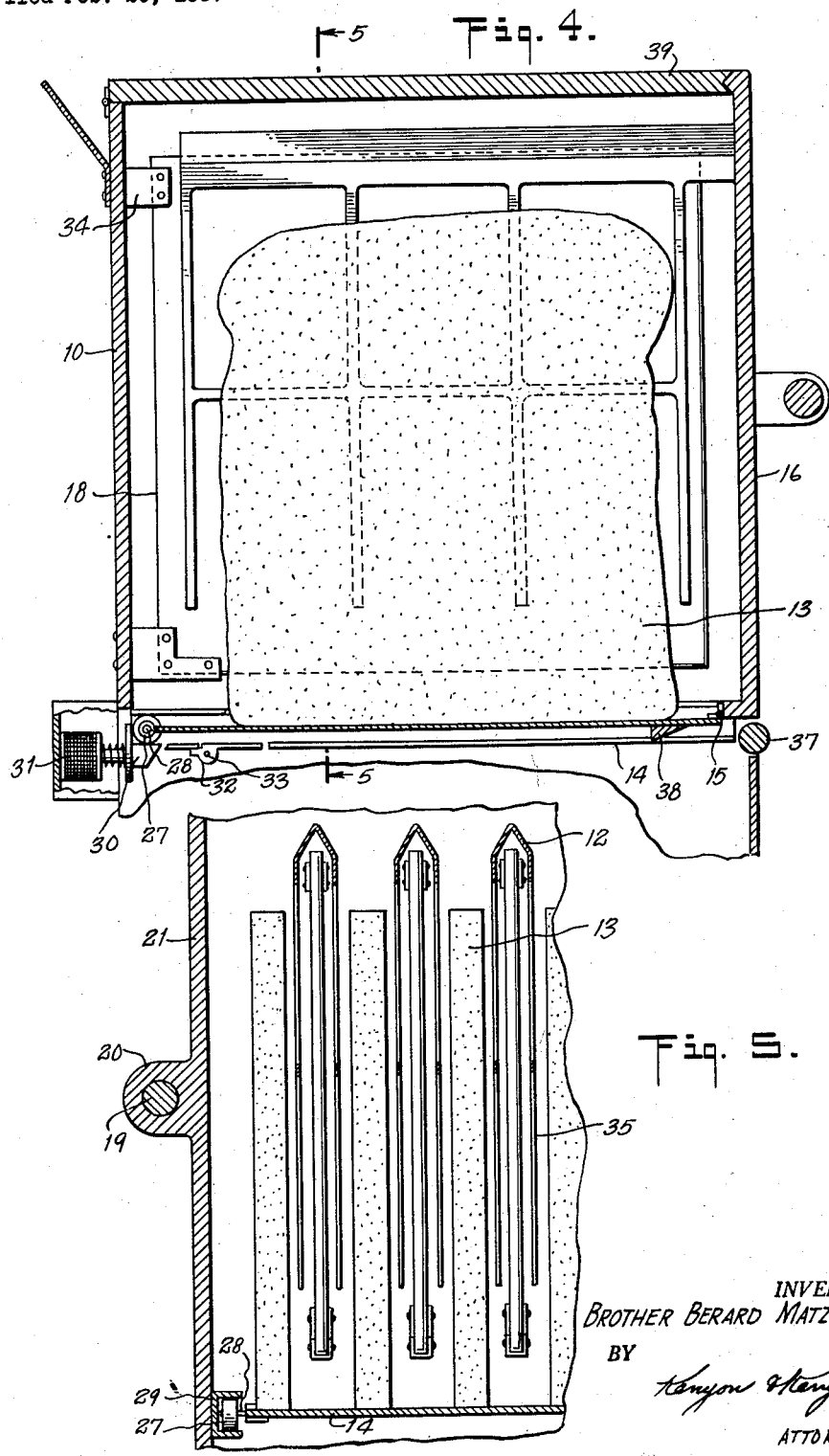

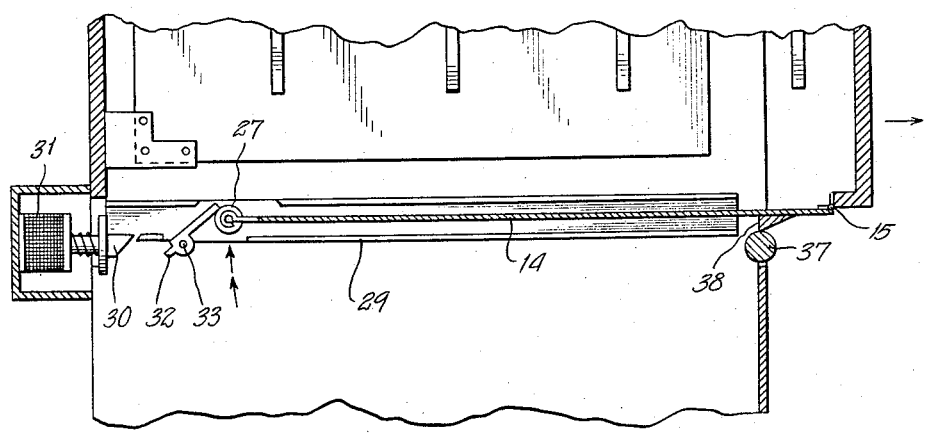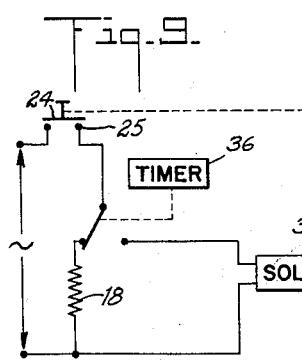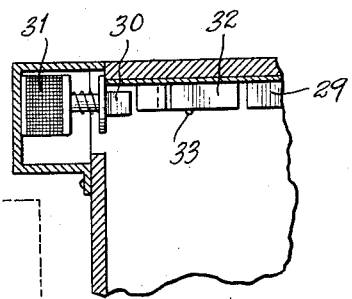

United States Patent Office 2,918,860
Patented Dec. 29, 1959

2,918,860

ELECTRIC TOASTER

Brother Berard Matzenauer, Paterson, N.J.

Application February 25, 1957, Serial No. 642,207

9 Claims. (Cl. 99—335)

This invention relates to electric toasters and more particularly to an electric toaster which is totally enclosed and which discharges the toasted bread from the bottom of the toaster by gravitational force.

Conventional toasters used in hospitals, schools, restaurants and other large institutions where it is desired to toast large quantities of bread in a relatively short period of time generally comprise an endless power driven conveyor system mounted in a cabinet. Secured to and integral with the conveyor system are a plurality of frames adapted to hold two or more slices of bread. The cabinet is open in the front to allow the slices of bread to be inserted on the frames.

In operation the conveyor system is energized and the bread to be toasted is inserted on one of the frames accessible through the open front of the cabinet. The conveyor system carries the frame with the bread past appropriate heating means, generally a gas flame, and discharges the toasted bread in the open front of the cabinet.

The disadvantage of commercial toasters of this general type is that they require the constant attention of an operator to place the slices of bread on the frames and remove the toasted bread from the front of the cabinet. In addition, toasters of this type are inefficient and expensive to operate since a large portion of the heat generated is not utilized in toasting the bread, but escapes through the opening in the front of the cabinet.

In view of the foregoing, it is an object of the invention to provide an improved electric toaster which overcomes the disadvantages of prior art devices, and which is efficient and economical to operate.

Another object of the invention is to provide an electric toaster which does not require the constant attention of an operator, and which will simultaneously toast an entire loaf of bread, or any desired quantity.

A further object of the invention is to provide an electric toaster in which the operating parts automatically assume proper operating position after the bread has been inserted and the cabinet closed, and in which the toasted bread is automatically discharged through the bottom of the toaster by gravitational force at the completion of the toasting cycle.

Other objects and advantages of the invention will be apparent to one skilled in the art from the accompanying description of a preferred embodiment and from the drawings in which:

Figure 1 is a perspective view of the toaster of the present invention, also showing in cross-section one of the guide channels in which the bottom drop plate is slidably movable;

Figure 2 is a sectional view taken along lines 2—2 of Figure 1;

Figure 3 is a sectional view taken along lines 3—3 of Figure 2;

Figure 4 is a sectional view taken along lines 4—4 of Figure 1;

Figure 5 is a sectional view taken along lines 5—5 of Figure 4;

Figure 7 is a detail view of a portion of Figure 6 illustrating the action of the fingers as the hinged bottom plate is swung to a closed position;

Figure 8 is a detail cross-sectional view illustrating the mounting of the fingers; and Figure 9 is a schematic wiring diagram for the electric toaster of the present invention.

Figure 6:
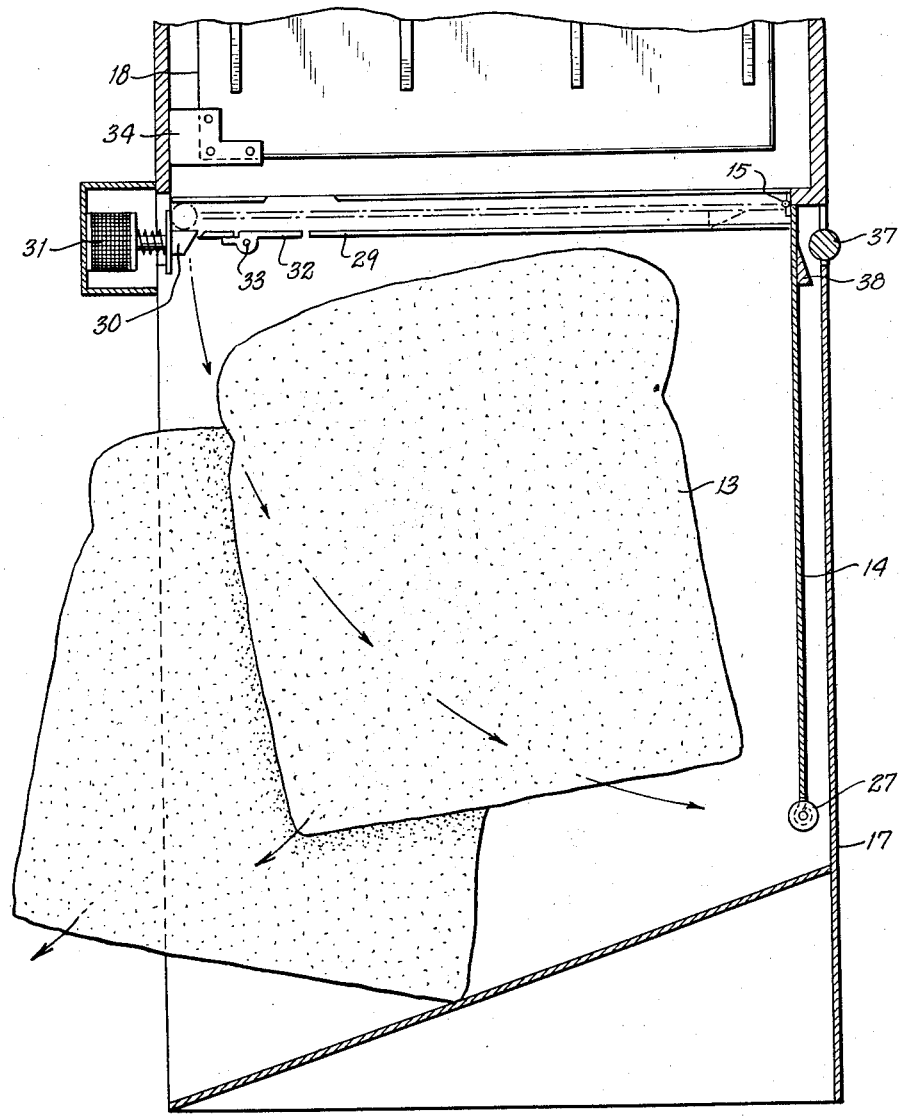
Figure 6 is a sectional view taken along lines 6—6 of Figure 1 after the drawer has been closed and the bottom plate released, the toasted bread being shown falling into a receptacle.

Referring to the drawings, and particularly to Figure 1, the electric toaster of the present invention comprises a cabinet 10 and a drawer 11 which is slidably movable longitudinally within the cabinet. The drawer 11 contains a plurality of spacer guides 12 which space the slices of bread 13 from each other, and has a hinged bottom comprising a bottom drop plate 14 attached by hinges 15 to the bottom of front frame 16 of drawer 11. Cabinet 10 contains a plurality of heating elements 18 (Figure 4) which interleave with the spacer guides 12 as the drawer 11 is closed. Operation of the drawer 11 turns the toaster on through automatic switch means, in a manner to be presently described. At the completion of the toasting cycle, the bottom drop plate 14 is automatically released, thereby releasing the bread slices 13 which fall into the receiving basket or receptacle 17. The toaster turns itself off when the bottom drop plate 14 is released.

The drawer 11 is supported by means of drawer guides 19 which are attached to or formed integrally with the front frame 16 of the drawer 11. These drawer guides may take any desired shape, but are preferably rods being circular in cross-section and extending longitudinally the length of the drawer 11. In Figure 1, only one drawer guide is shown on each side of the front frame 16, positioned intermediate the top and bottom of the sides of the front frame, but if desired, two or more drawer guides may be provided on each side of the front frame 16 in order to distribute the weight of the drawer. The drawer guides 19 are adapted to be slidably movable in guide rails 20 which are attached to, or formed integrally with, sides 21 of cabinet 10.

As shown in Figure 3, extending from the drawer guides 19 are keys 22 which are slidably movable in keyways 23 formed in the guide rails 20. Keyways 23 terminate inwardly from the back and front of cabinet 10 and limit the travel of drawer 11. In this manner drawer 11 cannot accidentally be withdrawn completely from cabinet 10. As shown in Figure 2, when drawer 11 is completely inserted in cabinet 10, the ends of drawer guides 19 depress contact 24 of switch 25 for a purpose to be presently described.

The bottom drop plate 14 of the drawer 11, as shown in Figure 4, is attached by hinges 15 to the bottom of front frame 16 of drawer 11 so that when the bottom drop plate is released from the horizontal position shown in Figure 4 it swings to the vertical position shown in Figure 6. Bottom drop plate 14 serves to enclose the bottom of the cabinet 10 when the drawer 11 is closed.

Guide rollers 27 are rotatably mounted on the rear edge of the bottom drop plate 14. As shown in Figures 4 and 5, rollers 27 are mounted on axles 28 which project beyond the side edges of the bottom drop plate 14. Attached to and extending longitudinally along the inner faces of the sides 21 of the cabinet 10 are guide channels 29 in which the guide rollers 27 are movable. These guide channels 29, as shown in Figures 1, 4 and 6, extend from the forward edge of the cabinet 10 and terminate adjacent the spring loaded plunger arm 30 of solenoid 31. Positioned within the guide channels 29 inwardly from the end adjacent the plunger arm 30 are fingers 32 pivotal about pins 33. These fingers serve a purpose presently to be described.

As shown in Figures 4 and 5, a plurality of heating elements 18 are located in the interior of the cabinet 10 and are in the form of grids of wire of appropriate resistance. These heating coils are supported by means of brackets 34 secured to the inner face of the back of the cabinet 11. The heating coils or grids 18 are generally rectangular and extend perpendicularly from the back of the cabinet 10 and terminate inwardly from the front of the cabinet. The spacing between the coils 18 is approximately twice the thickness of a slice of bread.

Secured to the inner face of the front frame 16 of the drawer 11 are spacer guides 12. The spacer guides extend the length of the drawer 11 and are generally U-shaped in cross-section, with the sides 35, 35 extending perpendicularly downward toward the bottom drop plate 14 of drawer 11. When the drawer 11 is inserted in the cabinet 10 each spacer guide 12 encloses a heating coil 18. The sides 35, 35 of the spacer guides 12 may be perforated or made of mesh in order to allow the heat to pass from the coils 18 to the bread 13, or if the sides are solid the heat may be reflected from the coils under the spacer guides to the bread. It is therefore seen that the spacer guides serve a two-fold purpose, to space the slices of bread from each other and to prevent the bread from coming into direct contact with the heating coils 18. As illustrated in Figure 5 the sides of the spacer guides 12 converge at the top in order to guide the individual bread slices between the spacer guides.

Alternatively, the front of the drawer 11 may be hinged at the bottom so as to swing outward and downward exposing the front interior of the cabinet 10 in which case the fronts of the spacer guides 12 may be beveled to facilitate the sliding in of bread slices along a horizontal plane.

In order to operate the electric toaster of the present invention the drawer 11 is first pulled out and the slices of a loaf of bread are inserted between the spacer guides 12. The drawer 11 is then closed and when it is completely closed, the end of drawer guide 19 depresses spring contact 24 of switch 25 which closes the circuit and energizes the heating coils 18.

The length of the heating cycle is regulated by control 36 on top of cabinet 10 which may be either a time or thermostatic control. When the desired temperature has been reached, or the required time has elapsed, the heating coils are de-energized and solenoid 31 is energized. This attracts arm 30 and pulls it away from cabinet 10, or toward the left in Figure 6, releasing the bottom drop plate 14 of drawer 11. Plate 14 swings on hinges 15 to the vertical position shown in Figure 6, releasing the bread which falls into the receiving basket or receptacle 17.

When plate 14 is disengaged from arm 30, the solenoid 31 is de-energized as well as switch 25 so that the circuit for the toaster is inoperative. The heating coils or grids 18 cannot be re-energized until the drawer is opened, releasing spring contact 24 of switch 25, and then closed again depressing contact 24 and repeating the toasting cycle. A schematic wiring diagram depicting the operation of the electric toaster of the present invention is illustrated in Figure 9.

To reload the toaster, drawer 11 is withdrawn from the cabinet 10. As the drawer 11 is opened the bottom drop plate 14 of drawer 11 passes over rollers 37 which swings plate 14 back into a horizontal position. Wedge 38 may be provided on the bottom of plate 14 to prevent the plate 14 from being abruptly swung from a vertical to a horizontal position.

As plate 14 approaches a horizontal position, it engages fingers 32 which rotate counter-clockwise about pins 33 and allow rollers 27 to enter guide channels 29. Fingers 32 only rotate in a counter-clockwise direction, and when the drawer 11 is inserted in the cabinet 10 the rollers 27 pass over fingers 32 and rest on plunger arm 30. It is therefore seen that when the drawer is completely closed the bottom drop plate 14 of drawer 11 is supported solely by plunger arm 30 of solenoid 31.

In order to provide access to the interior of cabinet 10 for cleaning, the top 39 of cabinet 10 may be hinged to the back of cabinet 10 as shown in Figures 1 and 4. For purposes of safety the front frame 16 of drawer 11 is provided with a tongue 40 which is engaged by lip 26 on the top 38 of the cabinet 10 when the drawer 11 is completely inserted. This prevents the top 39 from being opened when the drawer 11 is closed and the heating coils energized.

If desired the receiving basket or receptacle 17 may be formed integrally with the cabinet 10 as shown in Figure 1, or positioned below and spaced from the cabinet 10, the only requirement being that the receptacle portion be of sufficient depth to allow the bottom drop plate 14 of drawer 11 to rotate through approximately 90 degrees, or from a horizontal to a vertical position. With this modification the cabinet 10 has two sections, the upper section including the toaster elements and the bottom section the receiving basket or receptacle.

What has been described is an electric toaster which is inexpensive to manufacture, economical to operate, and simple to maintain due to the minimization of moving parts. The electric toaster of the present invention is particularly adapted for use in hospitals, schools, etc., where it is desired to toast a relatively large quantity of bread in a short period of time. With the present invention an entire loaf of sliced bread may be inserted in the drawer and at the end of the toasting cycle the bread falls into the receiving basket or receptacle from where it may be conveniently removed and the cycle continuously repeated.

I claim:

1. An electric toaster comprising a cabinet, a drawer slideable in said cabinet and including a bottom drop plate pivotably supported from the front end of the drawer, said plate being normally in engagement with plunger means secured to said cabinet when said drawer is fully inserted in said cabinet, said plate being adapted to pivot downwardly when disengaged from said plunger means, said drawer further including rack means to support pieces to be toasted at spaced positions therein, heater elements mounted in said cabinet and positioned to interleave with said rack means when said drawer is inserted in said cabinet, means to effect disengagement of said plate and plunger means when said drawer is fully inserted in said cabinet, and roller means to restore engagement when said drawer is thereafter opened.

2. An electric toaster comprising a cabinet, guide rails secured to the sides of said cabinet, a drawer slideable in said cabinet and including a bottom drop plate pivotably supported from the front end of the drawer, drawer guides secured to the front end of said drawer, said drawer guides being slideably movable in said guide rails, said plate being normally in engagement with plunger means secured to said cabinet when said drawer is fully inserted in said cabinet, said plate being adapted to pivot downwardly when disengaged from said plunger means, said drawer further including track means to support pieces to be toasted at spaced positions therein, heater elements mounted in said cabinet and positioned to interleave with said rack means when said drawer is inserted in said cabinet, means to effect disengagement of said plate and plunger means when said drawer is fully inserted in said cabinet, and roller means to restore engagement when said drawer is thereafter opened.

3. An electric toaster comprising a cabinet, guide rails secured to the sides of said cabinet, a drawer slideable in said cabinet and including a bottom drop plate pivotably supported from the front end of the drawer, drawer guides secured to the front end of said drawer, said drawer guides being slideably movable in said guide rails, guide channels secured to the sides of said cabinet, said plate during opening and closing of said drawer being normally in engagement with said guide channels and slideable therein and being adapted to pivot downwardly when disengaged therefrom, said drawer further including rack means to support pieces to be toasted at spaced positions therein, heater elements mounted in said cabinet and positioned to interleave with said rack means when said drawer is inserted in said cabinet, means to effect disengagement of said plate when said drawer is fully inserted in said cabinet, and roller means to restore engagement when said drawer is thereafter opened.

4. An electric toaster comprising a cabinet, guide rails secured to the sides of said cabinet, a drawer slideable in said cabinet and including a bottom drop plate pivotably supported from the front end of the drawer, drawer guides secured to the front end of said drawer, said drawer guides being slideably movable in said guide rails, guide channels secured to the sides of said cabinet, said plate being normally in engagement with said guide channels and slideable therein and being adapted to pivot downwardly when disengaged therefrom, said drawer further including rack means to support pieces to be toasted at spaced positions therein, heater elements mounted in said cabinet and positioned to interleave with said rack means when said drawer is inserted in said cabinet, switch means for energizing said heater elements when said drawer is fully inserted in said cabinet, means to effect disengagement of said plate from said guide channels when said drawer is fully inserted in said cabinet, and roller means to restore engagement when said drawer is thereafter opened.

5. An electric toaster comprising a cabinet, a solenoid secured to the back of said cabinet and including a plunger arm extending within said cabinet, a drawer slideable in said cabinet and including a bottom drop plate pivotably supported from the front end of the drawer, said plate being normally in engagement with said plunger arm and being adapted to pivot downwardly when disengaged therefrom, said drawer further including rack means to support pieces to be toasted at spaced positions therein, heater elements mounted in said cabinet and positioned to interleave with said rack means when said drawer is inserted in said cabinet, said plunger arm being withdrawn from said cabinet when said solenoid is energized disengaging said plate from said arm, and roller means to restore engagement when said drawer is thereafter opened.

6. An electric toaster comprising a cabinet, guide rails secured to the sides of said cabinet, a solenoid secured to the back of said cabinet and including a plunger arm extending within said cabinet, a drawer slideable in said cabinet and including a bottom drop plate pivotably supported from the front end of the drawer, drawer guides secured to the front end of said drawer, said drawer guides being slideably movable in said guide rails, said plate being normally in engagement with said plunger arm and being adapted to pivot downwardly when disengaged therefrom, said drawer further including rack means to support pieces to be toasted at spaced positions therein, heater elements mounted in said cabinet and positioned to interleave with said rack means when said drawer is fully inserted in said cabinet, said plunger arm being retracted when said solenoid is energized disengaging said plate from said arm, and roller means to restore engagement when said drawer is thereafter opened.

7. An electric toaster comprising a cabinet, guide rails secured to the sides of said cabinet extending longitudinally the length thereof and terminating in a switch having a spring actuated contact, a drawer slideable in said cabinet and including a bottom drop plate pivotably supported from the front end of the drawer, drawer guides secured to the front end of said drawer, said drawer guides being slideably movable in said guide rails, a solenoid secured to the back of said cabinet and including a plunger arm extending within said cabinet, guide channels secured to the sides of said cabinet extending longitudinally thereof and terminating adjacent said arm, said drawer further including rack means to support pieces to be toasted at spaced positions therein, heater elements mounted in said cabinet and positioned to interleave with said rack means when said drawer is inserted in said cabinet, said plate being normally in engagement with said arm when said drawer is fully inserted in said cabinet and slideable in said guide channels when said drawer is opened, said heater elements being energized when said drawer is fully inserted in said cabinet and said drawer guide depresses said contact, means interconnecting said switch and said solenoid such that when said heating coils are thereafter de-energized said solenoid is energized withdrawing said arm from said cabinet and disengaging said plate, said plate being adapted to pivot downwardly when disengaged from said arm, and roller means to restore engagement with said guide channels when said drawer is thereafter opened.

8. An electric toaster comprising a cabinet, tubular guide rails secured to the sides of said cabinet extending longitudinally the length thereof and terminating in a switch having a spring actuated contact, a drawer horizontally slideable in said cabinet and including a bottom drop plate pivotably supported from the front end of the drawer, cylindrical drawer guides secured to the sides of said drawer and extending the length thereof, said drawer guides being slideably movable in said guide rails and supporting said drawer such that said drawer is slidable into said cabinet and removable therefrom to a limiting position, a solenoid secured to the back of said cabinet and including a plunger arm extending within said cabinet, guide channels secured to the sides of said cabinet extending longitudinally thereof and terminating adjacent the end of said arm extending within said cabinet, said drawer further including vertical partitions secured to the inner face of the front end of said drawer and extending therefrom and adapted to support pieces to be toasted at spaced positions therein, heater elements mounted in said cabinet and positioned to interleave with said partitions when said drawer is inserted in said cabinet, said plate being normally in engagement with said arm when said drawer is fully inserted in said cabinet and slideable in said guide channels when said drawer is opened and closed, said heater elements being energized when said drawer is fully inserted in said cabinet and the end of said drawer guides depresses said contact, means interconnecting said switch and said solenoid such that when said heating coils are thereafter de-energized said solenoid is energized withdrawing said arm from said cabinet and disengaging said plate, a receptacle positioned beneath said plate, said plate being adapted to pivot downwardly when disengaged discharging said slices into said receptacle, and roller means to restore engagement of said plate with said guide channels when said drawer is thereafter opened.

9. An electric toaster comprising a cabinet, a drawer slideable in said cabinet and including a bottom drop plate pivotably supported from the front end of the drawer, said plate being normally in engagement with lever means secured to said cabinet when said drawer is fully inserted in said cabinet, said plate being adapted to pivot downwardly when disengaged from said lever means, a plurality of heater elements mounted in said cabinet, means to effect disengagement of said plate from said lever means when said drawer is fully inserted in said cabinet, and roller means to restore engagement when said drawer is thereafter opened.

No references cited.